UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

DIMETHYL-DIISOPROPYL-BENZIDIN AND PROCESS OF MAKING SAME.

1,314,924.     Specification of Letters Patent.     Patented Sept. 2, 1919.

No Drawing.     Application filed September 15, 1917. Serial No. 191,605.

*To all whom it may concern:*

Be it known that I, CHESTER E. ANDREWS, a citizen of the United States, residing at Pittsburgh, in the county of Allegheny and State of Pennsylvania, have invented Dimethyl-Diisopropyl-Benzidin and Processes of Making Same, of which the following is a specification.

The present invention relates to the production of a benzidin derivative, corresponding to benzidin in a manner analogous to the correspondence between cymene and benzene.

In the operation of the process of my present invention, I preferably start with mono-nitro-cymene, which is 1-methyl-2-nitro-4-isopropyl-benzene, or its isomer, 1-methyl-3-nitro-4-isopropyl-benzene, and reduce this material in an alkaline liquor, whereby dimethyl-diisopropyl-hydrazo-benzene or hydrazo-cymene is produced. The hydrazo-cymene is then subjected to the treatment known as the "benzidin transformation" whereby the two rings rearrange themselves and the benzidin derivative is produced.

In a specific example of my process, I first mix 72 parts of nitro-cymene, 20 parts of water and 50 parts of ethyl alcohol and 250 parts of a 30% solution of caustic soda. These materials are mixed together at ordinary room temperature and are placed in a vessel provided with a reflux condenser, and zinc dust slowly added, while the mixture is being stirred to make the reaction proceed smoothly. During this introduction of zinc dust, the temperature will rise rapidly, but with the reflux condenser and the agitation, it is not necessary to watch the temperature, it only being necessary to add zinc dust at such a rate that the reaction does not become violent.

When the zinc dust has all been added, the reaction mass is stirred for half an hour or so, without the necessity of controlling the temperature. By this time the reaction will be substantially complete, and the reaction mixture is diluted with 1,000 parts of water at ordinary room temperature, and the mass allowed to settle. An oily product will float on the surface, this product consisting essentially of hydrazo-cymene. After settling, the oily layer is drawn off. This material might be purified by adding an acid to form a soluble salt of hydrazo-cymene, for example hydrazo-cymene hydrochlorid, and then steam-distilling to remove other bodies present. This is not necessary under ordinary conditions, since it is usually more convenient at a later stage.

To the hydrazo-cymene constituting the oily layer is added 300 to 400 parts of water and the mixture heated to boiling. Hydrochloric acid is added gradually as long as the acid is absorbed by the liquid. The liquid is then boiled for a short time, 15 or 20 minutes ordinarily being sufficient. The transformation into the benzidin body is now substantially complete. Sulfuric acid is then added to precipitate the sulfate of dimethyl-diisopropyl-benzidin, which is a white crystalline powder. This is then removed from the liquid by filtration, while most of the impurities likely to be present in the original nitro-cymene remain in liquid condition, whereby considerable purification is effected and the sulfate is decomposed by adding for example a solution of caustic soda, which may be from 10 to 15%, preferably not over 15%. This precipitates the dimethyl-diisopropyl-benzidin, which is an oil. After settling, the oily layer is drawn off and can be purified by distillation or in any other suitable manner. The dimethyl-diisopropyl-benzidin is an oily liquid boiling at about 250° C.

The nitro-cymene employed in this treatment may be pure or crude, and it is not necessary to previously purify the material. The nitro-cymene may if desired be prepared by nitrating spruce turpentine, for example in accordance with the process of my copending application Serial No. 191245 filed September 13, 1917, or indirectly by the nitration of 2-acetyl amino cymene and subsequent elimination of the acetyl amino group for example in accordance with the process of my copending application Serial No. 191,607, filed September 15, 1917, (synthetic manufacture of thymol) which gives the mono nitro cymene isomeric with the one produced by nitration of spruce turpentine.

The reactions which take place in the process may be conveniently expressed as follows:

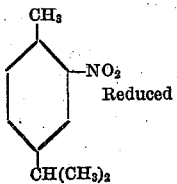
Reduced in alkaline solution

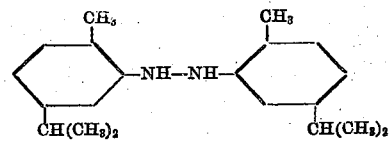

Subjected to "benzidin transformation"

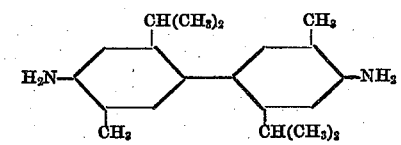

or

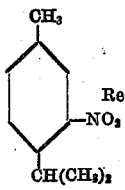
Reduced in alkaline solution

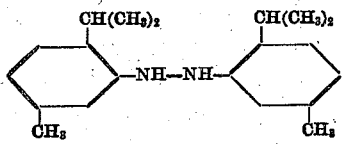

Subject to "benzidin transformation"

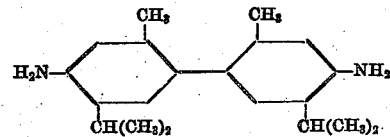

I claim:
1. Dimethyl-diisopropyl-benzidin.
2. Symmetrical dimethyl-diisopropyl-benzidin, the same being an oily liquid boiling at a temperature of about 250° C., and the sulfate of which is an insoluble white crystalline powder.
3. A process of making dimethyl-diisopropyl-benzidin which comprises reducing crude mono-nitro-cymene as produced by nitrating spruce turpentine, such reduction being performed in an alkaline solution to produce hydrazo-cymene, and subjecting the hydrazo cymene to the "benzidin transformation", whereby dimethyl-diisopropyl-benzidin is produced, and precipitating a compound of dimethyl-diisopropyl-benzidin while leaving a large part of the other constituents of the spruce turpentine in the solution.

In testimony whereof I affix my signature.

CHESTER E. ANDREWS.